US011968757B2

(12) United States Patent
Bergenek

(10) Patent No.: US 11,968,757 B2
(45) Date of Patent: Apr. 23, 2024

(54) LIGHTING DEVICE FOR GENERATING A WHITE MIXED LIGHT WITH CONTROLLABLE SPECTRAL CHARACTERISTICS

(71) Applicant: LEDVANCE GmbH, Garching bei Munchen (DE)

(72) Inventor: Krister Bergenek, Regensburg (DE)

(73) Assignee: LEDVANCE GmbH, Garching Bei Munchen (DE)

( * ) Notice: Subject to any disclaimer, the term of this patent is extended or adjusted under 35 U.S.C. 154(b) by 0 days.

(21) Appl. No.: 18/102,228

(22) Filed: Jan. 27, 2023

(65) Prior Publication Data

US 2023/0171862 A1 Jun. 1, 2023

Related U.S. Application Data

(63) Continuation of application No. 17/670,770, filed on Feb. 14, 2022, now Pat. No. 11,570,863.

(30) Foreign Application Priority Data

Feb. 17, 2021 (DE) ......................... 102021103698.4

(51) Int. Cl.
*H05B 45/20* (2020.01)
*H05B 47/10* (2020.01)

(52) U.S. Cl.
CPC .................................... *H05B 45/20* (2020.01)

(58) Field of Classification Search
CPC ...... H05B 45/20; H05B 47/10; H05B 47/175; H05B 47/155; H05B 47/135; F21V 9/40; F21Y 2115/10
See application file for complete search history.

(56) References Cited

U.S. PATENT DOCUMENTS 9,332,612 B1 * 5/2016 Weaver ................ H05B 47/155
11,184,964 B2 * 11/2021 Tipirneni ............... H05B 45/20
11,570,863 B2 * 1/2023 Bergenek ............... H05B 45/20
2005/0052378 A1 3/2005 Hacker
2008/0239717 A1 10/2008 Chen et al.
2014/0035472 A1 * 2/2014 Raj ........................ H05B 45/22 315/297

(Continued)

FOREIGN PATENT DOCUMENTS

DE 102012207185 A1 10/2013
DE 102014115076 A1 4/2016

*Primary Examiner* — Haissa Philogene
(74) *Attorney, Agent, or Firm* — Hayes Soloway PC

(57) ABSTRACT

A lighting device for generating a white mixed light having controllable spectral characteristics is provided. The lighting device comprises a number of white light sources for each making a contribution to the white mixed light by generating a white light with a respective spectral expression in each case that can be quantitatively characterized, so that the white lights generated by the white light sources can form corner points of a target range for the resulting mixed light in a spectral light parameter space. The lighting device further comprises control electronics for controlling proportional contributions of the white light sources so that the position corresponding to the resulting mixed white light can be varied within the target area spanned on the corner points in the spectral light parameter space.

20 Claims, 15 Drawing Sheets

(56) References Cited

U.S. PATENT DOCUMENTS

| | | | | |
|---|---|---|---|---|
| 2016/0010812 | A1* | 1/2016 | Kroell | F21K 9/64 353/84 |
| 2016/0273717 | A1* | 9/2016 | Krames | G02F 1/133603 |
| 2016/0363716 | A1 | 12/2016 | You | |
| 2017/0348506 | A1 | 12/2017 | Berman et al. | |
| 2019/0014638 | A1* | 1/2019 | Weaver | H04N 23/56 |
| 2019/0247528 | A1 | 8/2019 | Rodriguez | |
| 2020/0158939 | A1 | 5/2020 | Lotan et al. | |
| 2020/0179716 | A1 | 6/2020 | Dutta | |

* cited by examiner

LIGHTING DEVICE FOR GENERATING A WHITE MIXED LIGHT WITH CONTROLLABLE SPECTRAL CHARACTERISTICS

CROSS-REFERENCE TO RELATED APPLICATIONS

This patent application is a Continuation of U.S. patent application Ser. No. 17/670,770, filed on Feb. 14, 2022, which claims priority from German Patent Application No. 102021103698.4, filed on Feb. 17, 2021. Each of these patent applications is herein incorporated by reference in its entirety.

TECHNICAL FIELD

The invention relates in general to lighting devices. More specifically, the invention relates to lighting devices for producing a white mixed light with controllable spectral characteristics.

BACKGROUND

Lighting devices or light sources for generating a white light are known. Lighting devices with LEDs (Light Emitting Diodes) are also known, wherein in some cases, several LEDs are combined in order to obtain a white light with desired or preferred spectral characteristics. A satisfactory adjustment of spectral characteristics of lighting devices is often not easily possible due to the mutual interdependence between different spectral characteristics. Moreover, it is often unclear how to describe the spectral characteristics of white light.

SUMMARY

It is an object of the present invention to provide a lighting device for generating a white mixed light with controllable spectral characteristics, which makes it possible to control the spectral characteristics of the white mixed light in a simple and reliable manner.

To solve this problem, a lighting device for generating a white mixed light with controllable spectral characteristics is proposed. The lighting device comprises a number of white light sources each for making a contribution by generating a white light each with a quantitatively characterizable spectral expression or with a distinct spectral characteristic, so that the white lights generated by the white light sources can form corner points of a target range for the resulting mixed light in a spectral light parameter space.

The lighting device further comprises control electronics for controlling proportional contributions of the white light sources so that the position corresponding to the resulting white mixed light can be varied substantially within the target range spanned on the corner points in the spectral light parameter space.

A spectral characteristic or spectral property that can be quantitatively characterized can, in particular, be a white light property that is particularly preferred by users, in particular, in general or depending on the situation or in certain applications.

The spectral light parameter space can basically be a multidimensional space in which different spectral parameters are plotted on coordinate axes to characterize a white light spectrum according to a metric. For quantitative characterization of the spectral characteristics, different spectral parameters or different metrics can be used for the spectral light parameter space.

By providing the target space between the corner points in the spectral light parameter space, a light design space is provided in which the spectral characteristics of the white mixed light can be modified or adapted to the specific application by varying the proportional contributions of the white light sources.

The lighting device thus offers a scope for design or lighting design space in which the user or lighting designer can realize different white light recipes or white light compositions with different spectral properties.

In particular, a standardized metric can be used as the metric of the light parameter space. The use of a standardized metric can contribute to high reproducibility and precise adjustment of the spectral characteristics of the resulting mixed light.

The white light sources may, in particular, comprise individual LEDs and/or groups of LEDs and be designed in such a way that the spectral characteristics of the white light sources emphasize certain important aspects of white light or aspects of white light preferred by users.

In particular, one of the white light sources can be designed to produce a white light with a slightly oversaturated color spectrum or with a high gamut Rg or color gamut. A white light with such spectral characteristics is often perceived as particularly attractive by users. Such light is also referred to as “attractive light” in the following.

Another white light source can be designed, in particular, to produce a white light with particularly good color rendering or color fidelity. Such a light, similar to blackbody radiation or sunlight or incandescent light, is preferred by users in many applications. The white light source can, for example, comprise one or more LEDs which together produce a white light spectrum with a color rendering Rf of almost 100, which corresponds to the maximum value of color rendering. Such light is also referred to as “natural light” in the following.

One of the white light sources may further be designed to produce a particularly energy-efficient white light at the expense of a deterioration in the attractiveness and naturalness of the light. For example, an LED white light source may have a spectrum with low values of color rendering and gamut but the highest energy efficiency. Such light is also referred to as “effective light” in the following.

By varying the proportions of the white lights produced by the different light sources in the resulting white mixed light, the spectral properties of the resulting white light can be flexibly adjusted as required. If, for example, the user attaches particular importance to economy, the proportion of effective light can be increased, especially in comparison to the natural and the attractive light. If, on the other hand, much value is placed on color rendering, the proportion of natural light can be increased at the cost of a deterioration in attractiveness and efficiency.

The controlled mixing of lights with different spectral expressions, in particular attractiveness, naturalness, and efficiency, thus allows different “lighting recipes” to be realized as required.

The light parameter space can have color rendering Rf, gamut Rg, especially according to TM30 metric, and color temperature CCT as coordinates. The TM30 metric is a standardized metric used to characterize color rendering Rf and gamut Rg. The color temperature or CCT (Correlated Color Temperature) is used for spectral characterisation of white light. In the TM-30 metric, gamut Rg is normalized to 100 as a reference, wherein for undersaturated white light spectra Rg<100 and for oversaturated white light spectra Rg>100. In such an Rf-Rg-CCT space, for example, Rf can be plotted on the x-axis, Rg on the y-axis, and CCT on the z-axis. A light parameter space defined in this way can be used as a reference system for reliable and reproducible adjustability of spectral characteristics of white light.

The number of white light sources may include a group of the white light sources each for generating a white light with a first color temperature CCT1. Due to the equal color temperature CCT1 of the white light sources, the points corresponding to the individual lights can be represented in an Rf-Rg plane. By varying the proportional contributions of the white light sources of the group, the spectral characteristics of the resulting light, for example, the color rendering and/or gamut, can be varied without changing the color temperature of the resulting mixed light.

The group of white light sources may, in particular, comprise a first, a second, and a third white light source for generating respectively a first, a second, and a third white light, wherein the first white light, the second white light, and the third white light define respectively a first point, a second point, and a third point in the light parameter space as corner points of a triangular target area in the Rf-Rg plane. By varying the proportional contributions of the first light, the second light, and the third light, the point in the light parameter space corresponding to the resulting white mixed light can, in principle, be positioned anywhere within the triangle. The triangle in the Rf-Rg plane thus represents a target area in which the user or lighting designer can easily realize different white light compositions without having to change the color temperature of the resulting mixed light.

The first white light source may be designed to produce an attractive light, the second white light source may be designed to produce a natural light, and the third white light source may be designed to produce an efficient light. By changing the proportional contributions of the first, second, and third lights, the position of the point in the triangle corresponding to the resulting mixed white light can be changed. The naturalness, attractiveness, and efficiency of the resulting mixed light can thus be adjusted as required.

The white light sources can be designed in such a way that the color rendering Rf1 or the gamut Rg1 of the attractive light can lie, in particular, in the range 85<Rf1<100 or 102<Rg1<115, the color rendering Rf2 or the gamut Rg2 of the natural light lies in the range 90<Rf2<100 or 90<Rg2<100, and the color rendering Rf3 and the gamut Rg3 of the efficient light lies in the range Rf3<85 or Rg3<100. These parameter ranges are well suited for defining a relatively large target range in the parameter space in which the spectral characteristics of the white mixed light can be varied.

In particular, the white light sources may be designed so that the following relations apply to the color rendering or gamut of the three white light sources: Rf3<Rf1<Rf2 and Rg3<Rg2<Rg1. The color rendering or gamut of the resulting mixed light is determined by the ratios to which the three white lights are mixed together, which can be specifically influenced by controlling the white light sources.

The control electronics can be designed to control the first white light source, the second white light source, and the third white light source in such a way that a maximum of two of the three light sources are activated simultaneously. The composition of the resulting light or the light recipe can, for example, represent a compromise between the attractive light and the natural light, so that only the corresponding two light sources are represented in the recipe. The efficient light can remain switched off. Similarly, the light recipe can be a mixture of the natural light and the efficient light or the attractive light and the efficient light. The resulting light recipes will, then, follow lines connecting the three vertices in the TM30 diagram. By limiting the light recipe to the triangular perimeter, the totality of the adjustment possibilities of the lighting device can be reduced to a manageable subset, which can simplify a targeted adjustment of the lighting properties of the lighting device for the user and/or for the light recipe designer.

In some embodiments, the lighting device further comprises a second group of white light sources each having a spectral expression, wherein the white light sources of the second group are adapted to generate a white light having a second color temperature (CCT2) different from the first color temperature (CCT1). Due to the different color temperatures, the white light sources of the first group together with the white light sources of the second group create a three-dimensional target area in the Rf-Rg-CCT space or light parameter space, in which the target point position for adjusting the spectral characteristics can be varied by controlling the individual white light source. In principle, the number of light sources in the first or in the second group can be any natural number and depends, just like their positioning in the parameter space, on which light recipes are to be realized.

In some embodiments, the first group comprises two white light sources, while the second group comprises a single white light source. The white light produced by the single white light source of the second group may, in particular, have a certain attractiveness or naturalness and may be represented as a dot in the TM30 diagram or in the Rf-Rg plane. The light of the light source of the second group may, in particular, contain a higher blue light component and may also have a higher color temperature than the color temperature CCT1 of the first group of light sources. White light with higher blue light components or with a higher color temperature usually has an activating effect on the human body and can be used specifically for this purpose. Thus, a triangle can be drawn in the light parameter space as a target area within which the white point can be positioned. This constellation with three white light sources is easy to realise and particularly well suited for simple lighting recipes.

In some embodiments, the first group comprises three white light sources, while the second group comprises a single white light source, so that four corner points can be defined in the light parameter space to span a pyramid. The pyramid thus represents a design space or design freedom in the light parameter space in which the spectral characteristics of the resulting mixed light can be varied.

In some embodiments, each of the groups comprises three white light sources. In particular, the three white light sources of the second group may be designed similarly to the white light sources of the first group to each generate a white light with predefined attractiveness, naturalness, and efficiency, in particular, with a higher color temperature. The lights generated by the white light sources of the second group can be represented as corner points of a triangle in the light parameter space. The projections of these corner points onto the Rf-Rg plane or TM30 plane can be fundamentally differ from the positions of the corner points corresponding to the first group. The light recipe can thus be created as required by mixing the attractive, the natural, the efficient, and the activating light, wherein the position of a white point corresponding to the resulting mixed light can be selected or adjusted within the triangular prism defined by the corner points.

The control unit can be designed to control the white light sources in such a way that the point corresponding to the resulting mixed light describes an adjustable or predefined trajectory within the target area. In particular, the trajectory of the target point can be selected according to the user's preferences so that certain zones within the target area are avoided or preferred when the position of the white point is changed.

In particular, the control electronics can be designed to move the trajectory of the point corresponding to the resulting mixed light from a starting point to an end point within the target area in a circadian rhythm. Due to the movement of the point or target point corresponding to the resulting mixed light along the trajectory in the circadian rhythm, the spectral characteristics of the lighting device can automatically adapt depending on the preferences of the user depending on the time of day.

For example, the light spectrum of the resulting white mixed light can change during the day so that the resulting white light corresponds to a cold attractive light in the morning and a warm natural light in the evening, wherein the change during the day takes place mainly along the "efficiency edge." Thus, any of the users' preferred expressions can be accommodated during the course of the day. With the help of the predefined trajectory of the white point within the target area, dynamic or time-dependent lighting recipes can thus be realized, especially for HCL (Human-Centric Lighting).

At least one of the white light sources described above may comprise a number of LEDs or LED light sources for generating the respective white light with the respective color temperature and with the respective predefined spectral expression. The LED light sources may, in particular, comprise one or more LEDs, in particular LED combinations. By combining LEDs, the spectral characteristics of the white light sources can be influenced in a targeted manner, so that basically any spectral expression of the white light sources can be achieved.

The lighting device may comprise a user interface with a display device for visualizing the target area in the light parameter space so that the position in the target area corresponding to the resulting white mixed light can be controlled via the display device.

In some embodiments, the control electronics have a communication interface for wireless and/or wired communication between the control electronics and the user interface. For example, the user interface can be implemented as a touchscreen on a portable device such as a smart phone, tablet PC, or the like with a corresponding application software or app. On the display device, in particular, the target area in the light parameter space may be visually displayed as a triangle, a rectangle, a triangular prism, or the like, depending on the embodiment, so that the user can compose white light recipes by selecting the position of the target point in an intuitive and simple way. The settings selected by the user can be transferred from the user interface to the control electronics via the communication interface so that the individual white light sources can be controlled according to the user settings.

BRIEF DESCRIPTION OF THE DRAWINGS

The invention is now explained in more detail with the aid of the attached figures. The same reference signs are used in the figures for identical or similarly acting parts.

DETAILED DESCRIPTION

Figure 1:
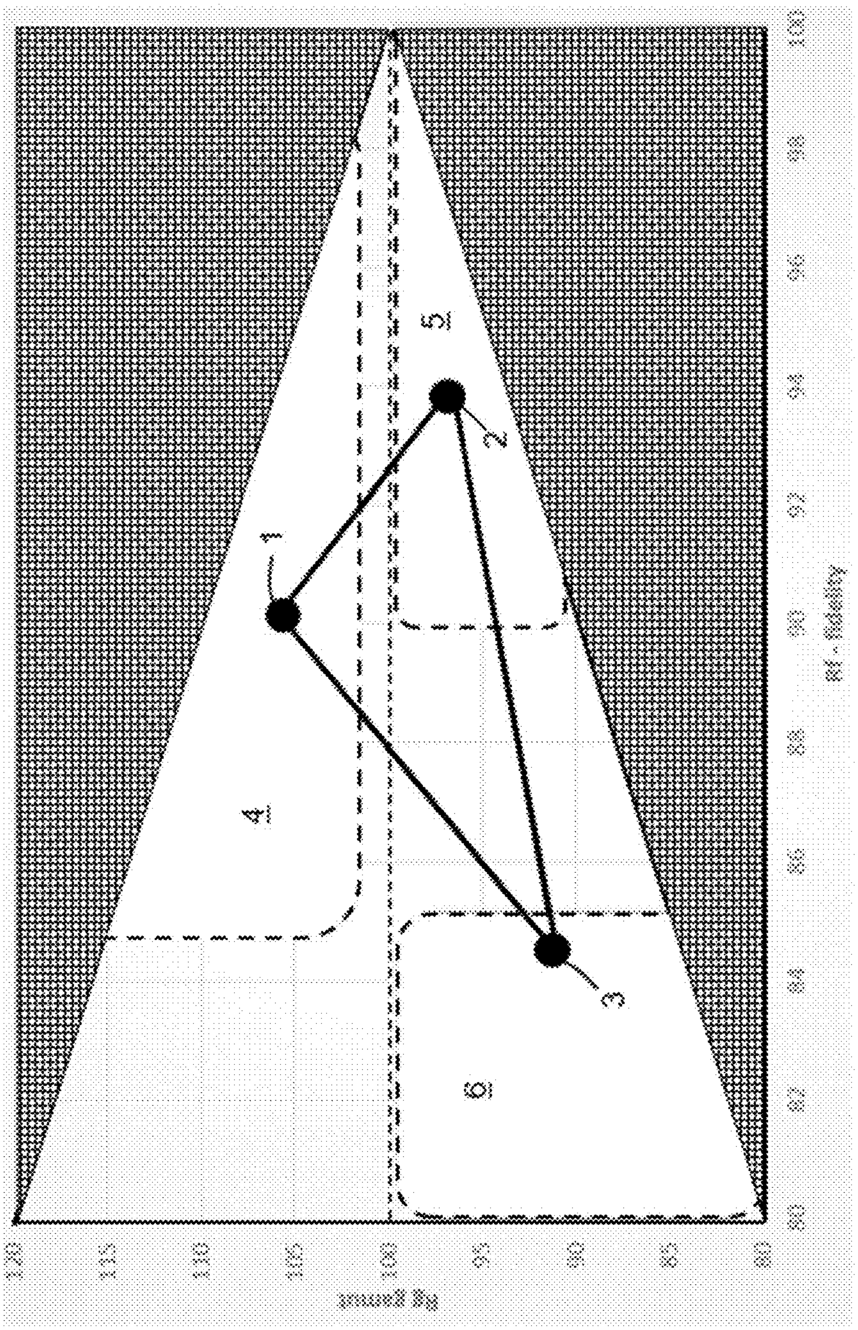
FIG. 1 shows an Rf-Rg diagram for characterizing white light spectra.

FIG. 1 shows an Rf-Rg diagram for characterizing white light spectra according to an example. In the Rf-Rg metric shown in FIG. 1, the color rendering or color rendering index Rf and the color gamut or color gamut index Rg according to the international standard TM30 are used to characterise white light spectra. The color rendering index Rf is plotted on the x-axis in FIG. 1, and the color gamut Rg is plotted on the y-axis. Each white light with a certain color rendering and with a certain color gamut can be assigned a point in the Rf-Rg diagram shown in FIG. 1. The three points 1, 2, and 3 shown in FIG. 1 thus correspond to three different white light sources with different spectral characteristics.

The Rf-Rg diagram shown in FIG. 1 is divided into several zones. The shaded triangular zones in the upper right area and in the lower right area illustrate the so-called "forbidden zones," which are practically unreachable according to the definition of the TM30 metric. Furthermore, the Rf-Rg diagram shows a first zone 4 delimited by a dashed line, in which the first point 1 corresponding to a first white light source is located. The first zone 4 is characterized by relatively high values of the color rendering Rf and by high values of the color gamut Rg. In the embodiment example shown, the first zone 4 lies in the parameter range $85<Rf<100$ or $102<Rg<115$. The first zone 4 thus defines a parameter range for white lights with oversaturated colors or high gamut and with relatively good color rendering. Such white light is often perceived as particularly attractive. The first zone 4 thus corresponds to the parameter range of an attractive white light. White light corresponding to point 1 can thus also be described as "attractive light."

The Rf-Rg diagram also shows a second zone 5 delimited by a dashed line, in which the second point 2 corresponding to a second white light source is located. The second zone 5 is characterized by high values of the color rendering Rf and by relatively low values of the color gamut Rg. In the embodiment example shown, the second zone 5 lies in the parameter range 90<Rf<100 or 90<Rg<98. Due to the high color rendering or color fidelity, the white light corresponding to the second point 2 can also be referred to as "natural light."

The Rf-Rg diagram also shows a third zone 6 delimited by a dashed line, in which the third point 3 corresponding to a third white light source is located. The third zone 6 is characterized by low values of the color rendering Rf as well as low values of the color gamut Rg. In the embodiment example shown, the third zone 6 lies in the parameter range 80<Rf<85 or 80<Rg<98.

A white light to be assigned to the third zone can, in particular, be generated by a white light source which is designed to generate white light in a particularly energy-efficient manner, in particular, by accepting a deterioration of the attractiveness or naturalness of the light. For example, the spectral characteristics of the light source can be selected in such a way that maximum energy efficiency is achieved, if necessary with minimum color rendering and minimum gamut. Such light is also referred to as "efficient light" in the following.

Figure 2:
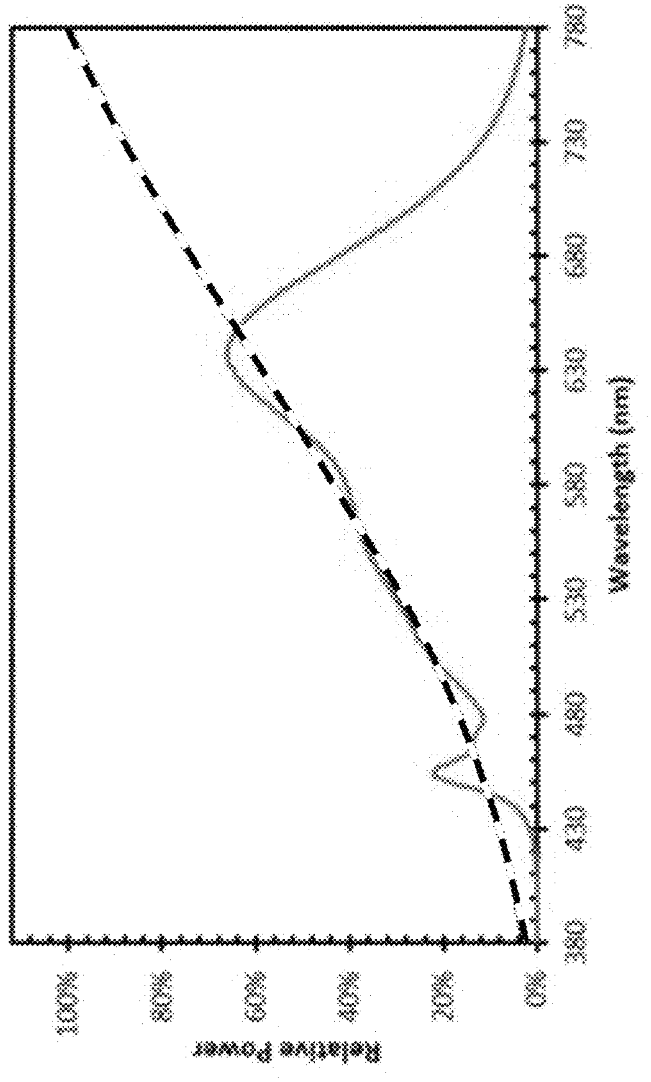
FIG. 2 shows a spectral distribution of a "natural" white light according to an embodiment example.

FIG. 2 shows a spectral distribution of a "natural" white light according to an embodiment example. In particular, FIG. 2 shows the spectral distribution of the natural white light in comparison to a reference light (shown in rectified form). The spectrum of the reference light corresponds essentially to the spectrum of the black body radiation. As can be seen in FIG. 2, the spectral curve of the "natural" light largely follows the spectral curve of the reference light. The color rendering Rf and the color gamut Rg of the "natural" light are approximately 100.

Figure 3:
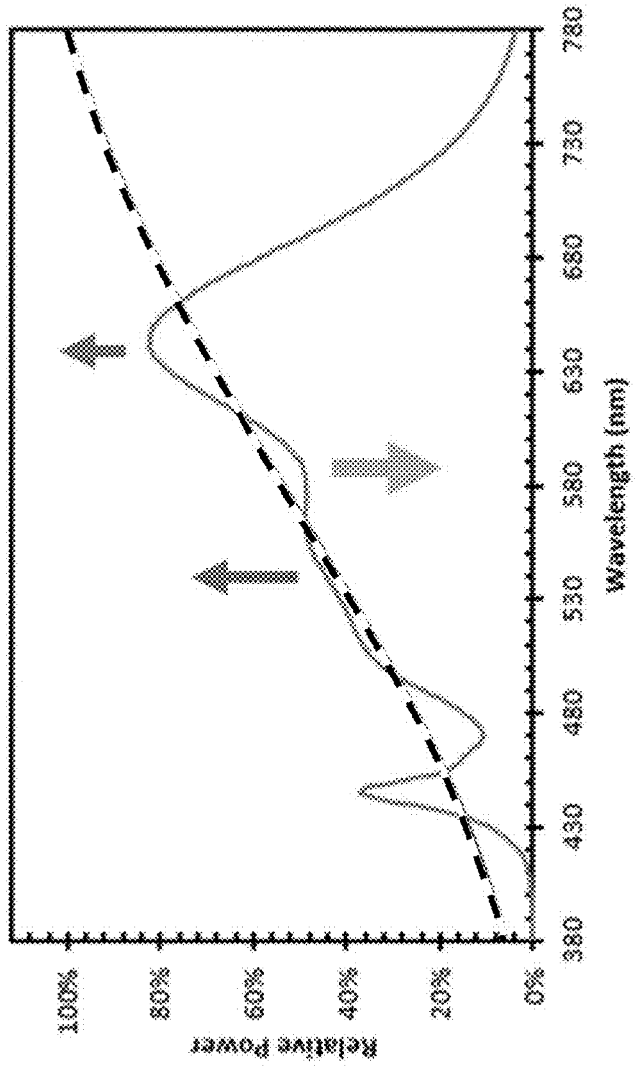
FIG. 3 shows a spectral distribution of an "attractive" white light according to an embodiment example.

FIG. 3 shows a spectral distribution of an "attractive" white light according to an embodiment example. The color spectrum shown in FIG. 3 differs from the color spectrum of FIG. 2, in particular, by a higher weighting of the spectrum in the red and in the green spectral range and by an underweighting of the spectrum in the yellow spectral range at wavelengths of about 580 nm. The spectrum shown in FIG. 3 corresponds to a gamut Rg of 105 and is perceived as particularly attractive by people due to the slight oversaturation of color.

Figure 4:
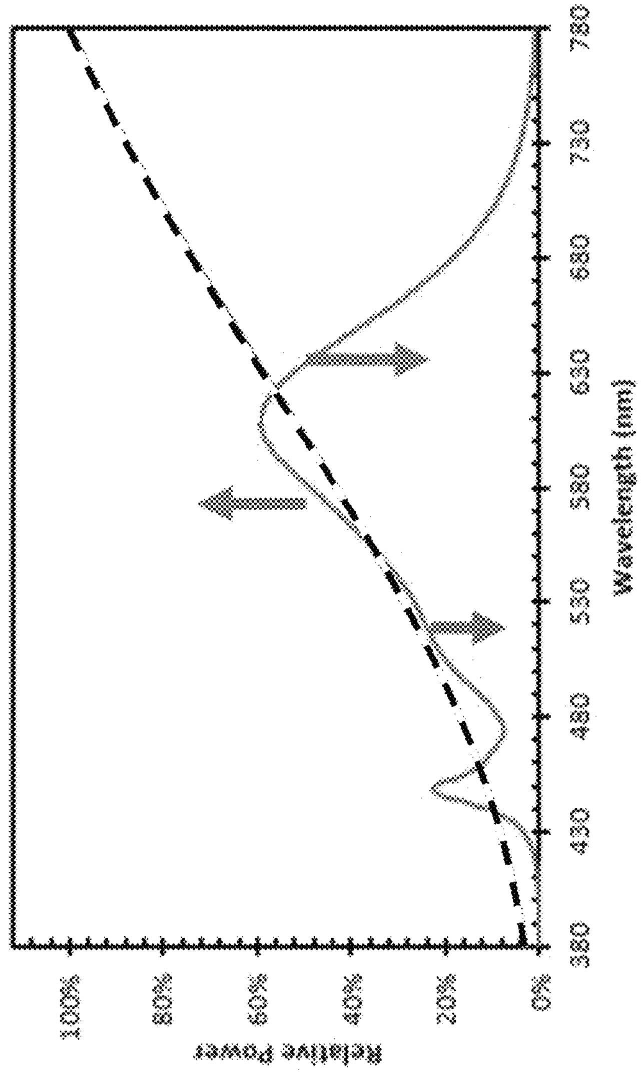
FIG. 4 shows a spectral distribution of an "efficient" white light according to an embodiment example.

FIG. 4 shows a spectral distribution of an "efficient" white light according to an example. The color spectrum shown in FIG. 4 differs from the color spectrum of FIG. 2, in particular, by an overweighting of the spectrum in the yellow-orange-amber-yellow color range at wavelengths of about 580 to 615 nm and by an underweighting of the spectrum in the red spectral range at wavelengths of about 620 to 650 nm and in the green spectral range at wavelengths of 510 to 530 nm. The spectrum shown in FIG. 4 corresponds to an "efficient" light with color rendering Rf of 85. Such white light can be generated in a particularly energy-efficient manner, especially by means of LED light sources.

Figure 5:
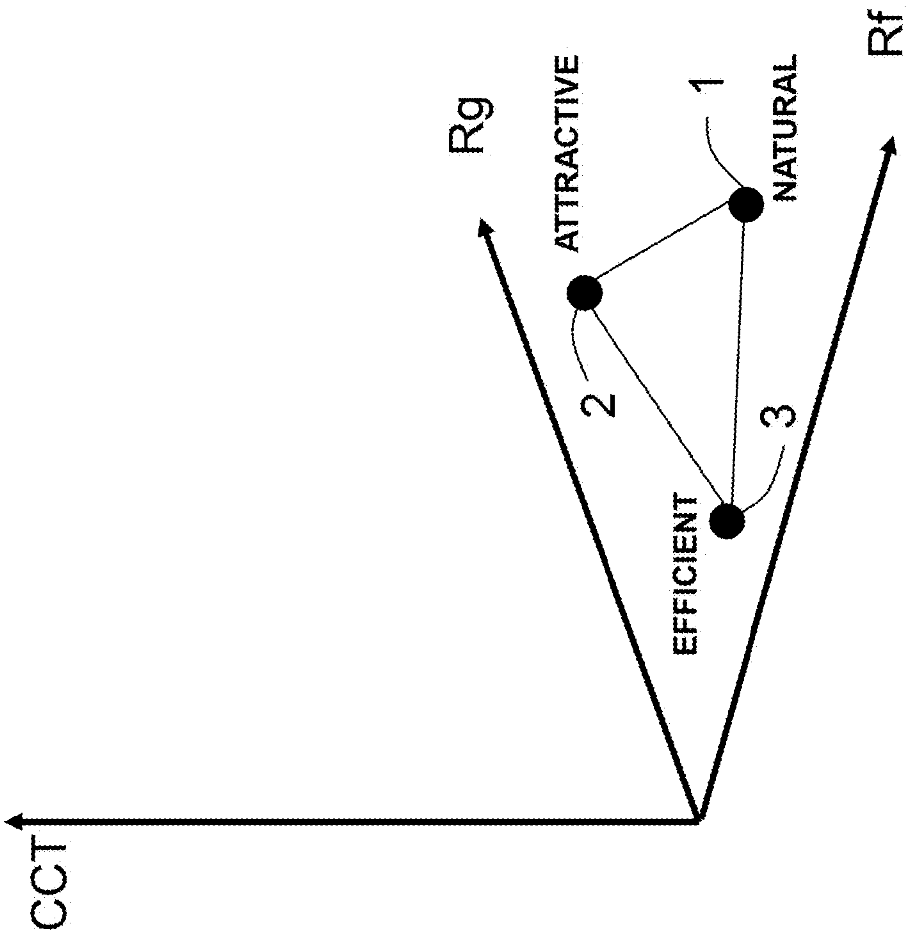
FIG. 5 shows a target area defined by three white light sources in a light parameter space according to an embodiment example.

FIG. 5 shows a target area defined by three white light sources in a light parameter space according to an embodiment example. In the light parameter space of FIG. 5, color rendering Rf and color gamut Rg as well as color temperature (CCT) are plotted as parameters on the coordinate axes. FIG. 5 shows three points in the Rf-Rg plane. Similar to FIG. 1, these three points correspond to an attractive light, a natural light, and an efficient light. Therefore, these three points are indicated by "ATTRACTIVE," "NATURAL," and "EFFICIENT" in FIG. 5. In this embodiment example, the three white lights have the same color temperature. When these white light sources are used in a lighting device to produce a white mixed light, the resulting white mixed light will also have the same color temperature. The point corresponding to the resulting mixed light will thus also lie in the Rf-Rg plane, within the triangle defined by the three points 1, 2, and 3. By changing the proportional contributions of the respective white light sources, for example, by the control electronics of the lighting device, the position in the light parameter space corresponding to the mixed light within the triangle can be varied. Consequently, the three white lights ATTRACTIVE, NATURAL, and EFFICIENT define a triangular target area or design space in the lighting parameter space, in which the user or lighting designer can realize different lighting recipes or spectral compositions for the white mixed light.

Figure 6:
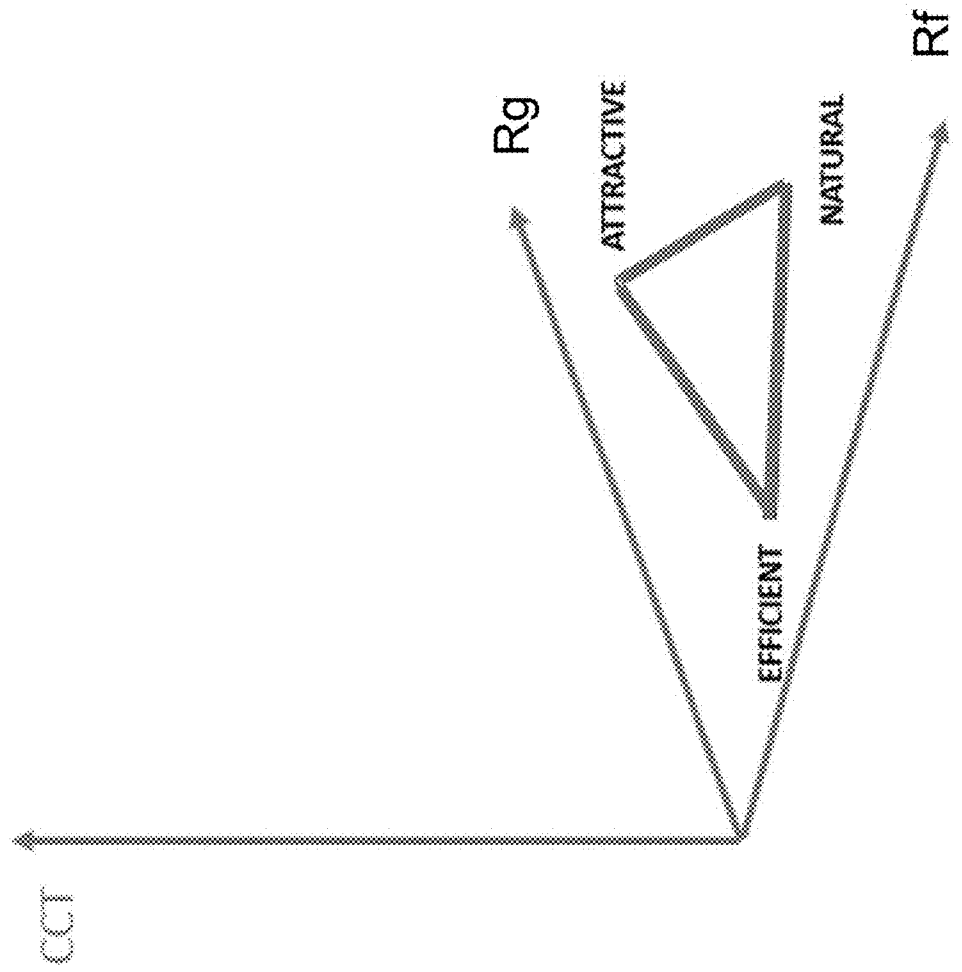
FIG. 6 shows a light design space according to an embodiment example.

FIG. 6 shows a light design space according to an example. The light design space shown can be realized by the three white light sources according to FIG. 5. In this case, the light design space is limited to the perimeter of the triangle of FIG. 5, which is illustrated by bold lines in FIG. 6. This design space corresponds to an operating mode of the lighting device when a maximum of two of the three white light sources are activated simultaneously, so that a maximum of two of the three white lights are represented in the white mixed light. By excluding one of the three white lights, the adjustment of the spectral characteristics of the resulting white light can be simplified for the user.

Figure 7:
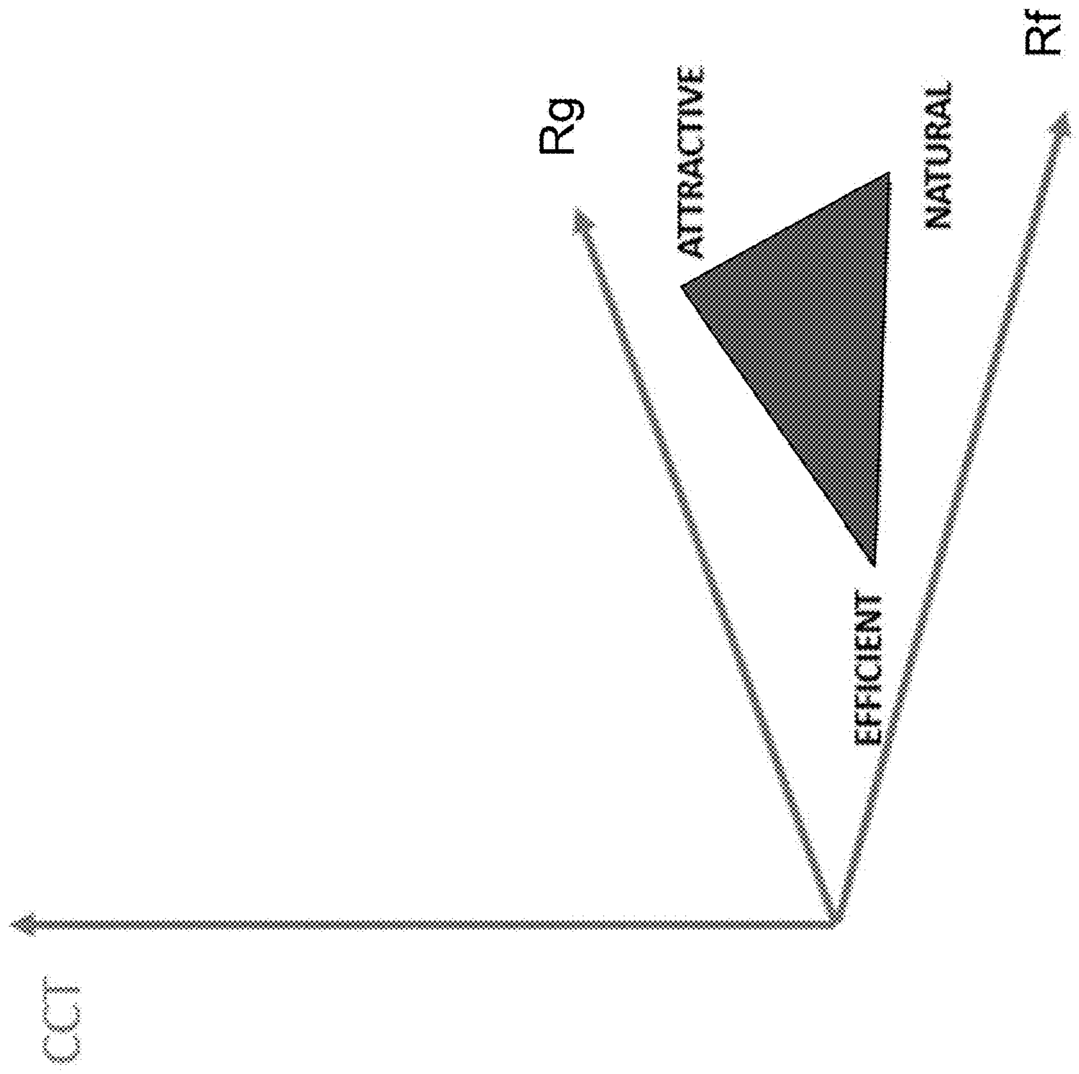
FIG. 7 shows a light design space according to a further embodiment.

FIG. 7 shows a lighting design space according to a further example. In this embodiment, the design space corresponds to the entire target area, which is defined by the triangle spanned on the three corner points. In particular, the control electronics can be configured such that the position within the triangle corresponding to the resulting mixed light can be varied as desired. In this case, the user can realize more complicated recipes or finer mixtures of the attractive, natural, and efficient lights.

Figure 8:
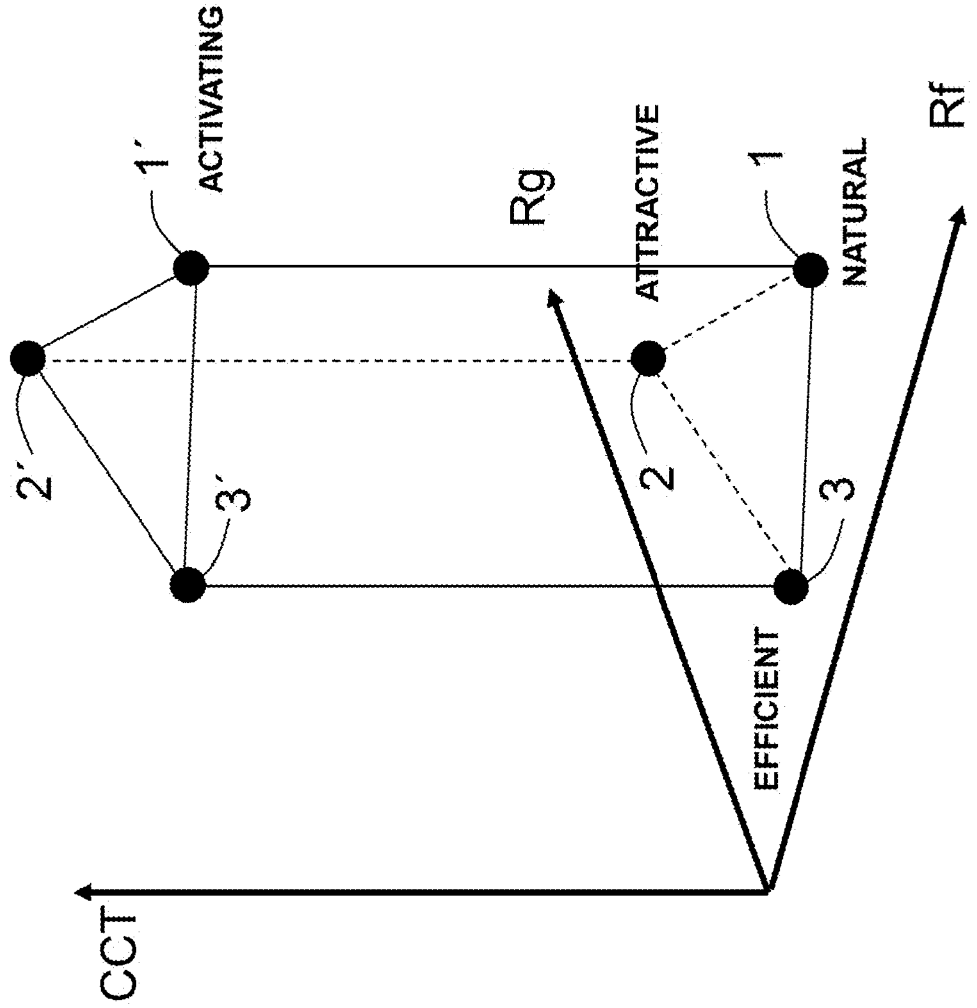
FIG. 8 shows a light design space according to another embodiment.

FIG. 8 shows a light design space according to another design example. The light design space shown in FIG. 8 is realized by six white light sources, wherein three additional white light sources with a higher color temperature have been added to the three white light sources of FIG. 5. The lights generated by the three additional white light sources are also represented as points in the light parameter space, which lie in a plane parallel to the Rf-Rg plane at a higher CCT. In terms of attractiveness, naturalness, and efficiency, the three additional white light sources correspond to the three white light sources of FIG. 5, so that the projection of the corresponding points 1', 2', and 3' on the Rf-RG planes correspond to points 1, 2, and 3. White light with a higher color temperature usually has an activating effect on the human body. This is why points 1', 2', and 3' in FIG. 8 are marked ACTIVATING. The six white light sources thus provide a three-dimensional target area in the form of a triangular prism for positioning the resulting white light point in the light parameter space. The user or lighting designer can adjust the spectral properties of the resulting light in terms of attractiveness, naturalness, efficiency, and activating effect within the triangular prism according to his preferences, if necessary depending on the situation. For example, by increasing the proportional intensity of the white light sources with the higher color temperature, the user can move the resulting white point upwards to the white points 1', 2', or 3' to increase the activating effect of the resulting white light.

Figure 9:
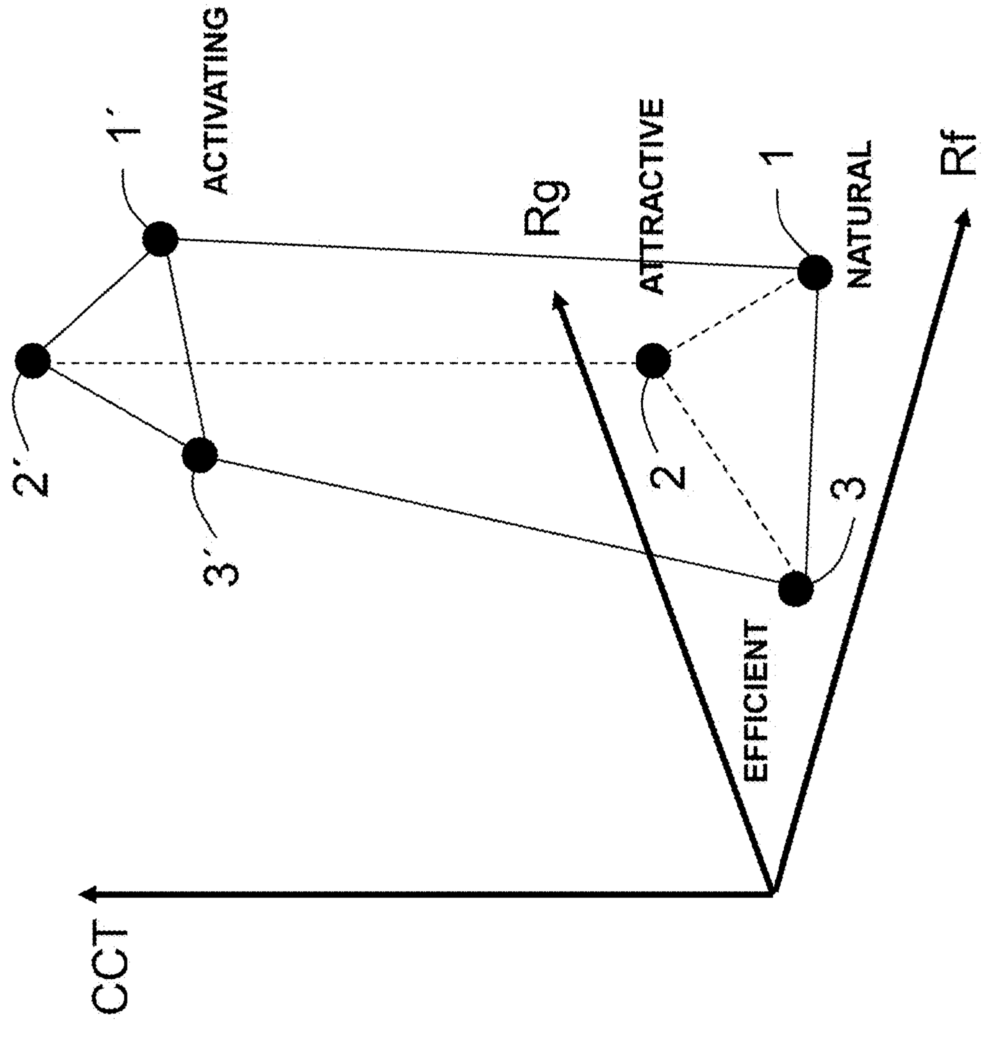
FIG. 9 shows a light design space according to a further embodiment.

FIG. 9 shows a light design space according to a further example. The light design space of FIG. 9 is substantially the same as the light design space of FIG. 8, wherein the attractiveness, naturalness, and efficiency of the white light points 1', 2', and 3' do not match the attractiveness, naturalness, and efficiency of the white light points 1, 2, and 3. In particular, the projection of the triangle formed by the white points 1', 2', and 3' on the Rf-Rg plane does not coincide with the triangle formed by the white points 1, 2, and 3. This example is intended to illustrate in particular that the light design space can in principle also have a curved or twisted shape, depending on the design.

Figure 10:
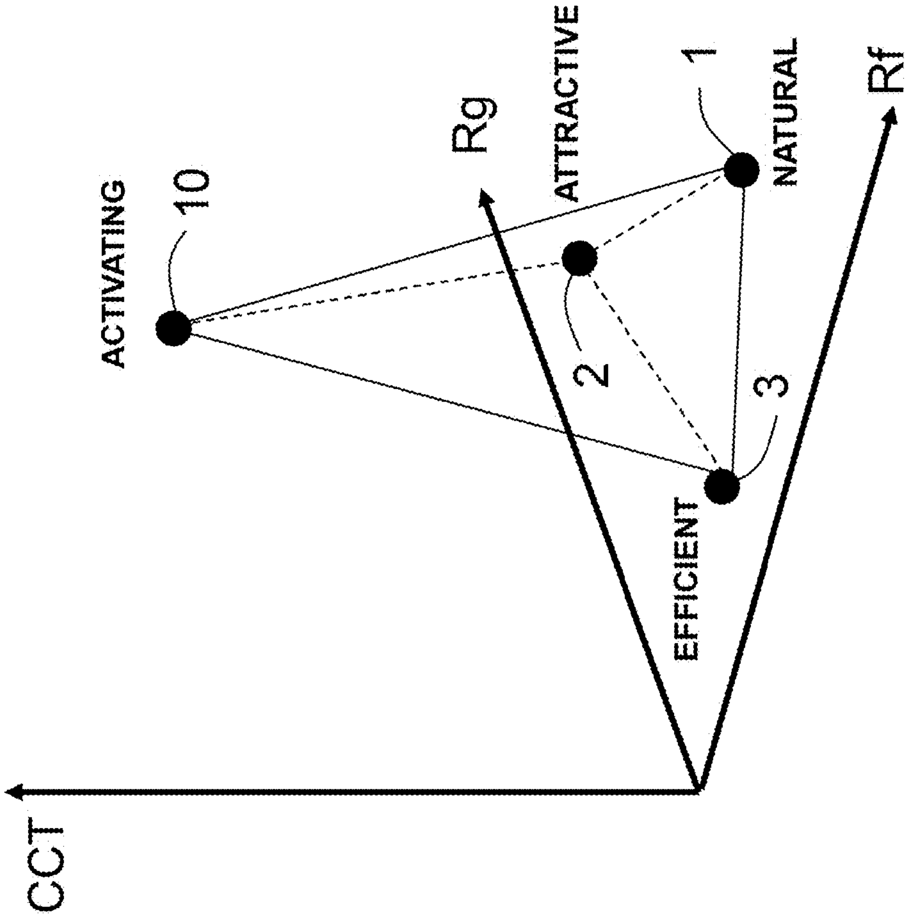
FIG. 10 shows a light design space according to another embodiment.

FIG. 10 shows a light design space according to another embodiment. In this example, four white light sources are used, which are represented by corresponding white light points in the light parameter space. The light design space of FIG. 10 is substantially the same as the light design space of FIG. 9, wherein instead of the second group of white light sources, only a single white light source with the higher color temperature is used as the fourth white light source. The corresponding white point 10 together with the first three white points 1, 2, and 3 forms a target area or light design space in the form of a, possibly oblique, pyramid in the light parameter space, in which the user or light designer can position the white point as required. For example, by increasing the proportional intensity of the fourth light, the user can shift the resulting white point upwards or towards white point 10 to increase the activating effect of the resulting mixed light.

Figure 11:
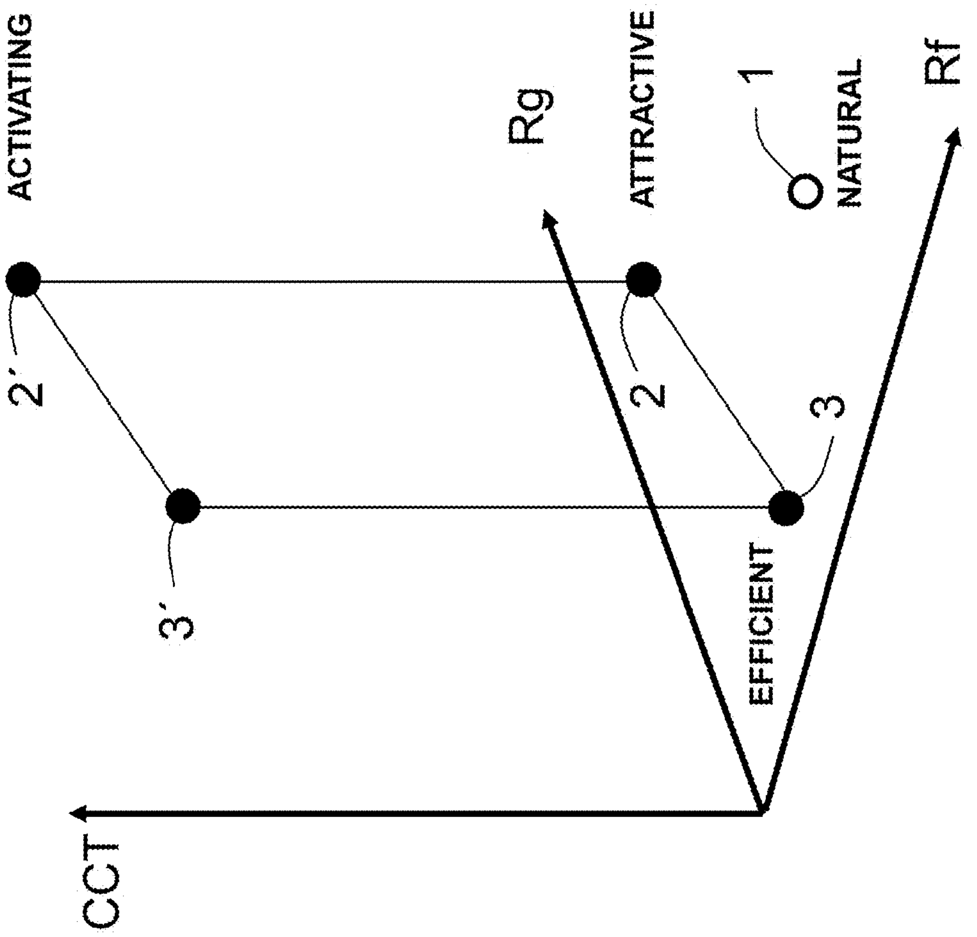
FIG. 11 shows a light design space according to a further embodiment.

FIG. 11 shows a light design space according to a further embodiment example. In this example, the light design space is defined by two white light sources of the first group with corresponding white points 2 and 3 at the lower color temperature and by two white light sources of the second group with corresponding white points 2' and 3' at a higher color temperature. The white points 2, 3, 2', and 3' thus define a rectangular area as the lighting design space or target area. In the embodiment shown, only attractive and efficient white light sources are used. In other embodiments, other combinations of white light sources, for example, natural and efficient or natural and attractive, are used depending on the user's preferences.

Figure 12:
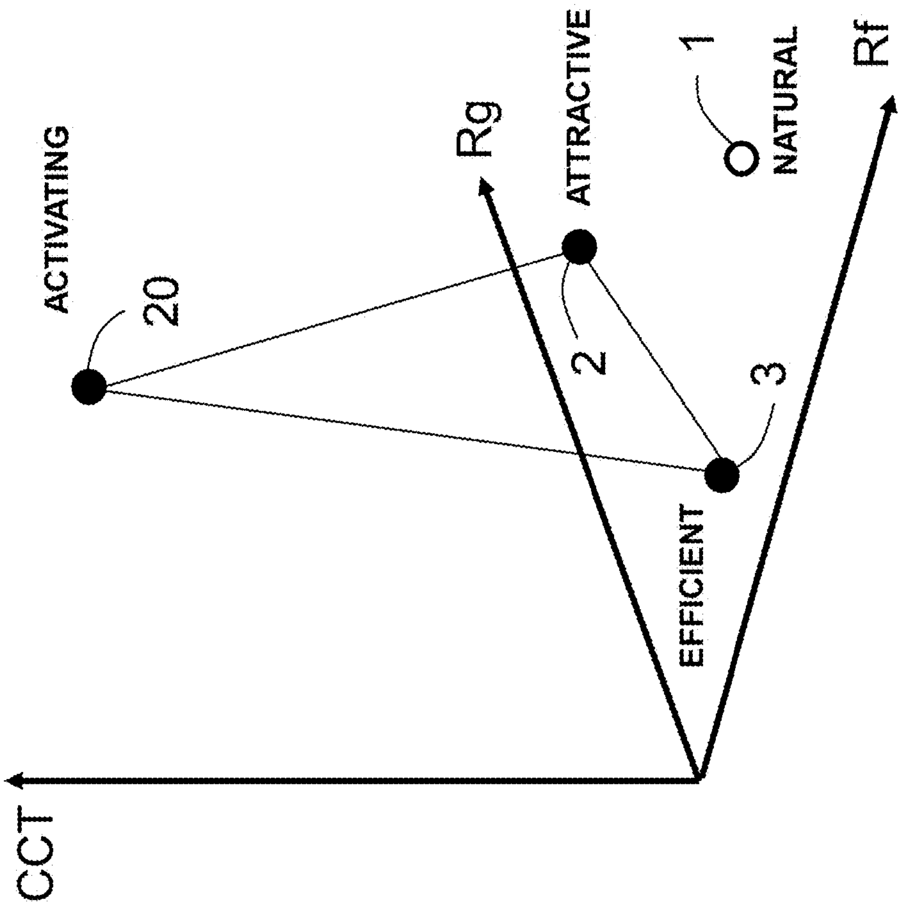
FIG. 12 shows a light design space according to another embodiment.

FIG. 12 shows a light design space according to another embodiment. In this embodiment, the light design space is defined by two white light sources of the first group with corresponding white points 2 and 3 at the lower color temperature and by one white light source of the second group with corresponding white points 20 at the higher color temperature. The white points 2, 3, and 20 thus define a two-dimensional triangular area as the light design space or target area. The light design space according to FIG. 12 can be provided in a relatively simple manner using three white light sources. In the example shown, the main focus is on efficiency and attractiveness or activating effect of the light, but other combinations of white light sources are also possible, depending on the user's preferences.

Figure 13:
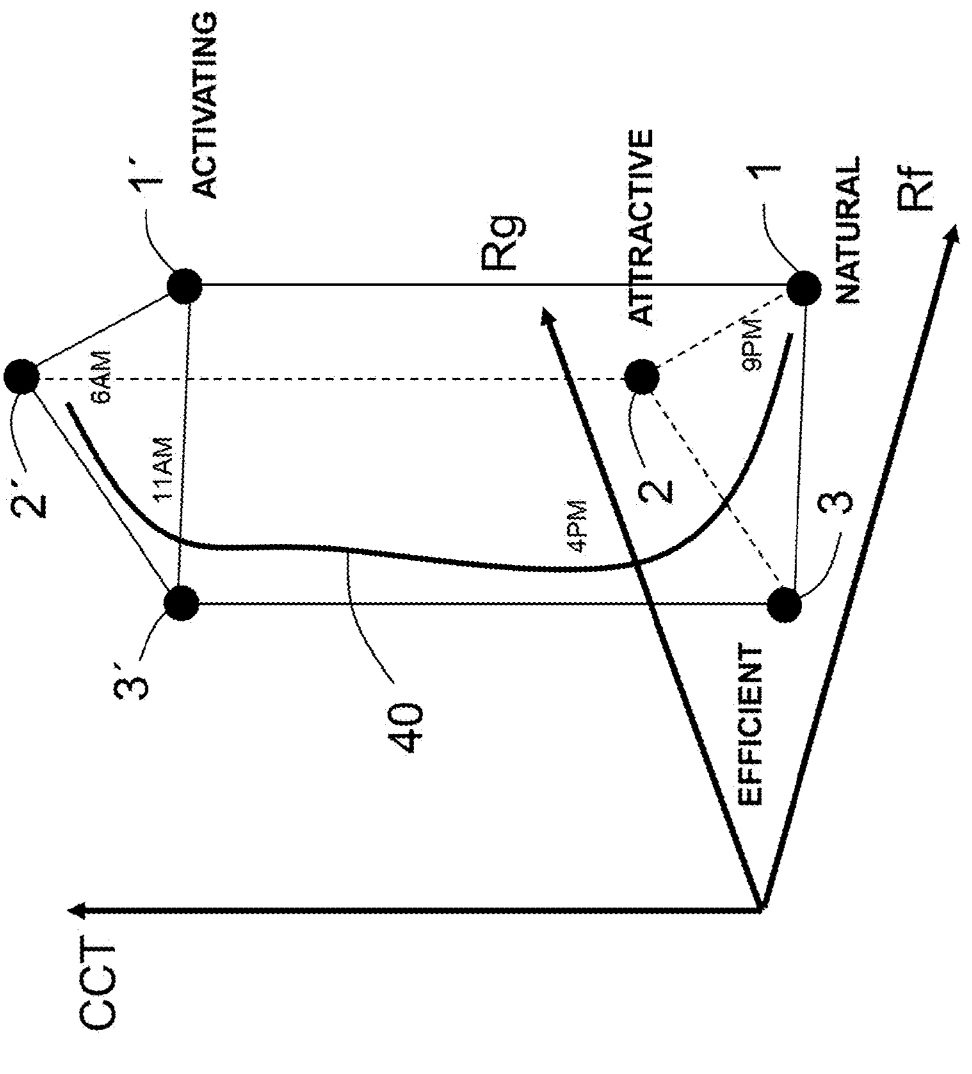
FIG. 13 shows a dynamic white light curve according to an embodiment example within the light design space according to FIG. 8.

FIG. 13 shows a dynamic white light curve according to an embodiment within the light design space according to FIG. 8. The dynamic white light curve 40 is shown as a solid line extending between a first end near white point 1 at the lower color temperature and a second end near white point 2' at the higher color temperature. The dynamic white curve 40 describes the trajectory in the light parameter space through which the target point or the position of the white point corresponding to the resulting mixed light passes in the course of the day in the target area. In FIG. 13, times of day are also indicated to illustrate that the target point in the morning at 6:00 a.m. starts approximately at the white point 2', which corresponds to an attractive white light with an activating effect. Such a light can provide both rapid activation and a positive mood after waking up. During the day, especially between 11:00 and 16:00, the dynamic white light curve 40 runs mainly along the longitudinal edge of the triangular prism between the white points 3' and 3, corresponding to an efficient light with gradually decreasing color temperature. In the evening around 9:00 p.m., the curve ends near white point 1 in the Rf-Rg plane at the low color temperature, which corresponds to a cosy natural light. The dynamic white light curve 40 of FIG. 14 thus enables the user to start the day with an attractive activating light and to end the day with a natural warm light, wherein electrical energy is saved during the day.

Figure 14:
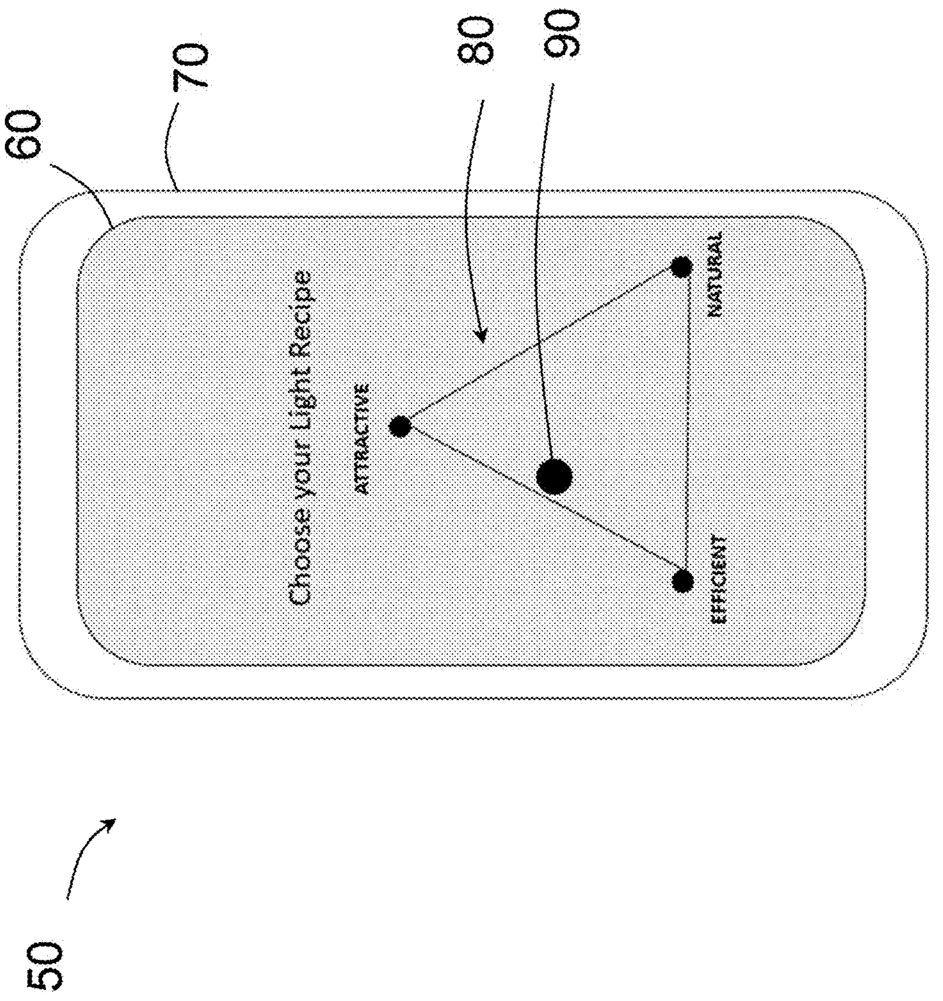
FIG. 14 shows a user interface of the lighting device according to an embodiment, and FIG. 15 schematically shows a lighting device for generating a white mixed light according to an embodiment example.

FIG. 14 shows a user interface of the lighting device according to an embodiment example. In this embodiment, the user interface 50 has a display device 60 in the form of a touchscreen. The user interface 50 can be implemented, in particular, on a smart phone, tablet PC, or the like with a corresponding application software or app. The user interface 50 is designed to display an image 80 of the target area as well as an image 90 of the target point or the white light point corresponding to the white mixed light to be generated. In FIG. 14, a triangular target area according to the embodiment of FIG. 5 is shown as an example. Target areas in the form of a triangular prism or other form can also be visualized in principle by means of the display device 60.

Figure 15:
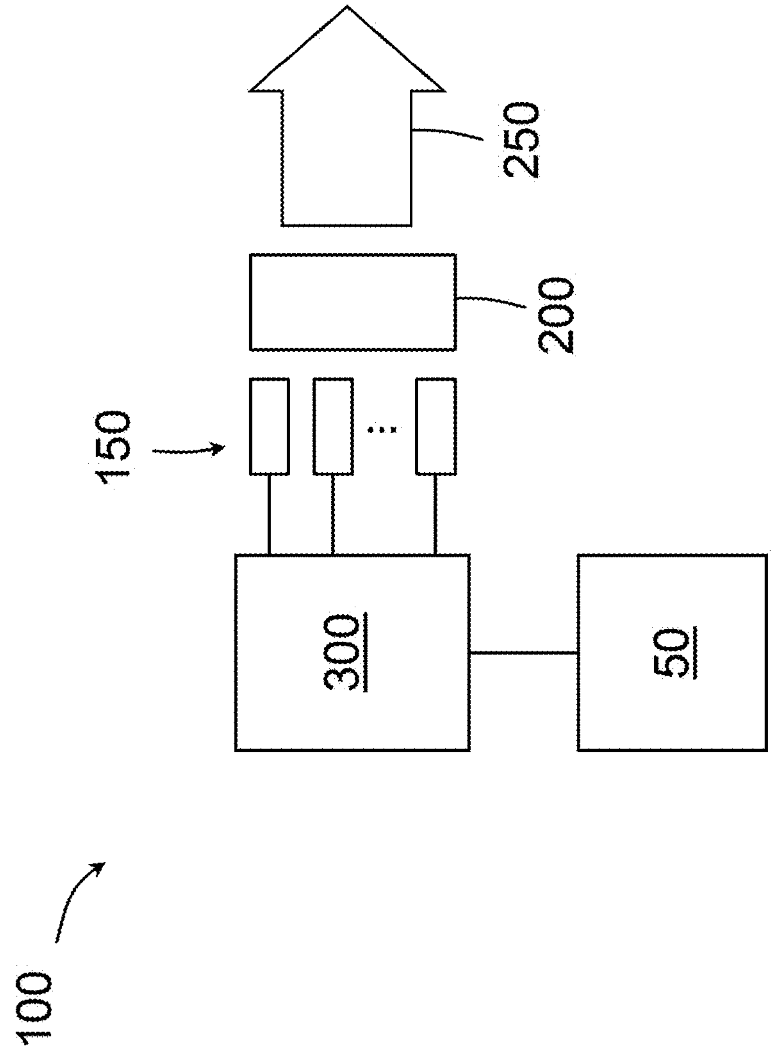

FIG. 15 schematically shows a lighting device for generating a white mixed light according to an embodiment example. The lighting device 100 comprises a number of white light sources 150. In this embodiment example, the white light sources 150 are designed as LED light sources. The LED light sources may each have an LED combination for generating a respective white light with a respective spectral expression that can be quantitatively characterized. The LEDs of different white light sources may, in particular, be mounted on a common circuit board or separately. The lighting device 100 further comprises mixing optics 200 for mixing the lights generated by the white light sources 150 to form a resulting white mixed light 250. The resulting white mixed light is shown schematically as a broad arrow in FIG. 15.

The lighting device 100 further comprises control electronics 300 for controlling the white light sources 150 so that the proportional contributions of the white lights produced by the white light sources 150 to the resulting mixed light 250 can be varied. The lighting device 100 further comprises driver electronics (not shown) for driving the white light sources 150. The driver electronics may be formed as part of the control electronics 300 or also as separate units. The control electronics 300 comprise a memory unit (not shown) and a processor (not shown). The memory unit may, in particular, contain machine-readable instructions for the processor to control the driver electronics.

The illuminating device 100 further comprises a user interface 50, which is connected to the control electronics 200 of the illuminating device 100 via corresponding communication interfaces (not shown). The communication interfaces may be configured for wired and/or wireless communication between the control electronics 300 and the user interface 50. In some embodiments, the user interface 50 is similar to the user interface shown in FIG. 14.

By changing the number as well as the spectral characteristics of the white light sources 150, different target areas in the light parameter space can be shaped to realise different light recipes and displayed on the display device 60 of the user interface 50.

During operation of the lighting device 100, the user can position the target point of the white light to be generated in the target area in any desired way by means of the display device 60 of the user interface 50 in order to compose the desired mixed light composition or light recipe. Due to the visual representation of the target area as well as the target point in the target area on the display device, the operation of the lighting device 100 can be largely intuitive. The settings selected by the user can, then, be transmitted to the control electronics 300 via the communication interfaces, so that the proportional contributions of the white light sources 150 to create the desired mixed light can be adjusted accordingly. The user can, thus, adjust the desired spectral characteristics of the resulting light in a simple and convenient manner.

The lighting device 100 may be a lamp or a luminaire. In some embodiments, the lighting device 100 comprises a network interface. The network interface may, in particular, be designed to communicate with the user interface 50 and/or with a central control unit via a standard protocol such as DALI®, Wi-Fi®, Zigbee®, Bluetooth®, or the like, either wired or wireless. In particular, the communication interface may be used to transmit instructions to the control electronics 300 for modifying the lighting recipes. The communication interface may also be adapted to communicate with other network participants to form lighting networks.

By means of the lighting device described above, basically all essential requirements for lighting designers in the area of general lighting can be covered. By using the white light sources, the mixed light also becomes white, even if the proportional contributions of individual white light sources are not exactly maintained.

The light recipes or the corresponding areas in the light parameter space can be pre-set for individual lighting devices as well as for entire product classes of lighting devices by configuring or programming the control electronics. Furthermore, the light recipes can be varied in time as required. In particular, the spectral composition of the mixed light produced by the lighting device can be varied according to the time of day using dynamic light recipes. In addition, the user can flexibly and conveniently vary the light recipes as required, for example, depending on the application or mood, via the user interface.

Although at least one exemplary embodiment has been shown in the foregoing description, various changes and modifications may be made. The aforementioned embodiments are examples only and are not intended to limit the scope, applicability or configuration of the present disclosure in any way. Rather, the foregoing description provides the person skilled in the art with a plan for implementing at least one exemplary embodiment, wherein numerous changes in the function and arrangement of elements described in an exemplary embodiment may be made without departing from the scope of protection of the appended claims and their legal equivalents. Furthermore, according to the principles described herein, several modules or several products can also be connected with each other in order to obtain further functions.

LIST OF REFERENCE SIGNS

1, 1' white light point
2, 2' white light point
3, 3' white light point
4 first zone
5 second zone
6 third zone
10 white light point
20 white light point
40 dynamic white light curve
50 user interface
60 display device
80 display of the target area
90 display of the target point
100 lighting device
150 white light source
200 mixed optics
250 mixed light
300 control electronics
CCT color temperature
CCT1 first color temperature
CCT2 second color temperature
Rf color rendering
Rg color gamut
CCT color temperature

What is claimed is:

1. A lighting device for generating a mixed white light with controllable spectral characteristics, the lighting device comprising:

a first light source configured to produce a first white light quantitatively characterized by a first set of spectral characteristics in which at least one of an oversaturated color spectrum and color gamut is prioritized over other characteristics;

a second light source configured to produce a second white light quantitatively characterized by a second set of spectral characteristics in which at least one of color rendering and color fidelity is prioritized over other characteristics;

a third light source configured to produce a third white light quantitatively characterized by a third set of spectral characteristics in which energy efficiency is prioritized over other characteristics; and control electronics configured to control proportional contributions of the first light source, the second light source, and the third light source to the mixed white light such that the resultant mixed white light is variable by a user in a spectral light parameter space.

2. The lighting device of claim 1, wherein the spectral light parameter space has color rendering (Rf), color gamut (Rg), and color temperature (CCT) as coordinates.

3. The lighting device of claim 1, wherein the first white light, the second white light, and the third white light define, correspondingly, a first point, a second point, and a third point in the spectral light parameter space as corner points of a target area in a color rendering-color gamut (Rf-Rg) plane.

4. The lighting device of claim 3, wherein a position corresponding to the resultant mixed white light is variable substantially within the target area in the spectral light parameter space.

5. The lighting device of claim 1, wherein at least one of:

a color rendering (Rf1) of the first light source is greater than a color rendering (Rf3) of the third light source but less than a color rendering (Rf2) of the second light source; and a color gamut (Rg2) of the second light source is greater than a color gamut (Rg3) of the third light source but less than a color gamut (Rg1) of the first light source.

6. The lighting device of claim 5, wherein:
a color rendering (Rf1) of the first light source is greater than a color rendering (Rf3) of the third light source but less than a color rendering (Rf2) of the second light source; and
a color gamut (Rg2) of the second light source is greater than a color gamut (Rg3) of the third light source but less than a color gamut (Rg1) of the first light source.

7. The lighting device of claim 1, wherein at least one of:
a color rendering (Rf1) of the first white light is in the range of 85-100;
a color gamut (Rg1) of the first white light is in the range of 102-115;
a color rendering (Rf2) of the second white light is in the range of 90-100;
a color gamut (Rg2) of the second white light is in the range of 90-100;
a color rendering (Rf3) of the third white light is less than 85; and
a color gamut (Rg3) of the third white light is less than 100.

8. The lighting device of claim 1, wherein at least one of:
with respect to the first light source, the at least one of the oversaturated color spectrum and color gamut is prioritized over other characteristics such that the first white light is characterizable as attractive to the user; and
with respect to the second light source, the at least one of color rendering and color fidelity is prioritized over other characteristics such that the second white light is characterizable as natural to the user.

9. The lighting device of claim 1, wherein the control electronics are configured to control the first light source, the second light source, and the third light source in such a way that a maximum of two of those three light sources is activated simultaneously.

10. The lighting device of claim 1, wherein the first white light, the second white light, and the third white light form corner points of a target area for the resultant mixed white light in the spectral parameter space.

11. The lighting device of claim 10, wherein the control electronics are configured to control the first light source, the second light source, and the third light source in such a way that a point corresponding to the resultant mixed white light describes an adjustable or predetermined trajectory within the target area for the resultant mixed white light in the spectral parameter space.

12. The lighting device of claim 1, wherein the control electronics comprise:
a processing element; and
a memory unit communicatively coupled with the processing element.

13. The lighting device of claim 1, wherein the control electronics are configured to vary a spectral composition of the mixed white light at least one of:
in time; and
based on user input received by the lighting device.

14. The lighting device of claim 1, wherein at least one of the first light source, the second light source, and the third light source comprises a plurality of light-emitting diodes (LEDs) configured for generating the respective first white light, second white light, or third white light with a predefined color temperature.

15. The lighting device of claim 14, wherein the plurality of LEDs is further configured for generating the respective first white light, second white light, or third white light with a predefined spectral expression.

16. The lighting device of claim 1, further comprising a communication interface configured to provide the lighting device with one or more communication capabilities.

17. The lighting device of claim 1, further comprising a network interface configured to provide the lighting device with one or more network interfacing capabilities.

18. The lighting device of claim 1, wherein the lighting device is a lamp or a luminaire.

19. A system comprising:
the lighting device of claim 1; and
a display device configured to be communicatively coupled with the lighting device.

20. The system of claim 19, wherein the display device is configured for visualizing a target area for the resultant mixed white light in the spectral parameter space so that a position in the target area corresponding to the resultant mixed white light is controllable by the user via the display device.

* * * * *